United States Patent [19]
Manduley et al.

[11] 3,987,429
[45] Oct. 19, 1976

[54] MALFUNCTION DETECTOR SYSTEM FOR ITEM CONVEYOR

[75] Inventors: Flavio M. Manduley, Seymour; Daniel F. Dlugos, Huntington, both of Conn.

[73] Assignee: Pitney-Bowes, Inc., Stamford, Conn.

[22] Filed: Nov. 11, 1975

[21] Appl. No.: 631,168

[52] U.S. Cl. .............................. 340/259; 209/73; 235/92 CA; 235/92 SH
[51] Int. Cl.[2] .................. G08B 21/00; B07C 5/00; H03K 23/02
[58] Field of Search .................. 340/149 R, 259; 250/561, 223 R, 557; 235/92 SH; 209/73

[56] References Cited
UNITED STATES PATENTS

| | | |
|---|---|---|
| 3,778,629 | 12/1973 | Terryn .......................... 340/259 X |
| 3,813,525 | 5/1974 | Kitterman et al. ............. 235/92 CA |
| 3,837,484 | 9/1974 | Ruckebler et al. ............. 340/259 X |
| 3,944,933 | 3/1976 | Gallet ............................ 340/259 X |

Primary Examiner—Donald J. Yusko
Attorney, Agent, or Firm—William D. Soltow, Jr.; Albert W. Scribner; Robert S. Salzman

[57] ABSTRACT

A malfunction detector system includes sensors spaced along an article flow path. Recirculating shift registers shift a binary 1 signal through succeeding stages as article-detected signals are received from the associated sensors. Logic elements compare the contents of stage "$n$" of one shift register with the contents of stage "$n+1$" of the shift register connected to the next sensor on the article flow path. The concurrent existence of binary 1 signals in the compared stages indicates a jam or a sensor failure has occurred.

9 Claims, 7 Drawing Figures

Fig. 5.

| PIECE # IN/OUT | | SHIFT REG 54 A B C D | PIECE # IN/OUT | | SHIFT REG 58 A B C D |
|---|---|---|---|---|---|
| INITIAL | | 1 0 0 0 | INITIAL | | 1 0 0 0 |
| 1 | IN | 0 1 0 0 | | | |
|   | OUT | 0 1 0 0 | | | |
| 2 | IN | 0 0 1 0 | 1 | IN | 0 1 0 0 |
|   | OUT | 0 0 1 0 |   | OUT | 0 1 0 0 |
| 3 | IN | 0 0 0 1 | 2 | IN | 0 0 1 0 |
|   | OUT | 0 0 0 1 |   | OUT | 0 0 1 0 |
| 4 | IN | 1 0 0 0 | 3 | IN | 0 0 0 1 |
|   | OUT | 1 0 0 0 |   | OUT | 0 0 0 1 |
| 5 | IN | 0 1 0 0 | 4 | IN | 1 0 0 0 |
|   | OUT | 0 1 0 0 |   | OUT | 1 0 0 0 |

Fig. 6.

| PIECE # IN/OUT | | SHIFT REG 54 A B C D | PIECE # IN/OUT | | SHIFT REG 58 A B C D |
|---|---|---|---|---|---|
| INITIAL | | 1 0 0 0 | INITIAL | | 1 0 0 0 |
| 1 | IN | 1 0 0 0 | | | |
|   | OUT | 1 0 0 0 | | | |
| 2 | IN | 1 0 0 0 | 1 | IN | 0 1 0 0 |

Fig. 7.

| PIECE # IN/OUT | | SHIFT REG 54 A B C D | PIECE # IN/OUT | | SHIFT REG 58 A B C D |
|---|---|---|---|---|---|
| INITIAL | | 1 0 0 0 | INITIAL | | 1 0 0 0 |
| 1 | IN | 0 1 0 0 | | | |
|   | OUT | 0 1 0 0 | | | |
| 2 | IN | 0 0 1 0 | 1 | IN | 0 1 0 0 |
|   | OUT | 0 0 1 0 |   | OUT | 0 1 0 0 |
| 3 | IN | 0 0 0 1 | 2 | IN | 0 1 0 0 |
|   | OUT | 0 0 0 1 |   | OUT | 0 1 0 0 |
| 4 | IN | 1 0 0 0 | 3 | IN | 0 1 0 0 |

MALFUNCTION DETECTOR SYSTEM FOR ITEM CONVEYOR

BACKGROUND OF THE INVENTION

The present invention relates to an item transport, and more particularly to a system for detecting both jammed articles and failures of sensors within the detector itself.

The assignee of the present invention has long been involved in providing mailing machines and systems for government and industry, which efficiently and expeditiously handle all types of mailing needs. One of the areas of mail handling which has yet to be extensively explored, is the automatic handling of both sealed and unsealed inter mixed mail without the need for operator intervention.

Machines have been developed which automatically weigh mixed mail, whether sealed or unsealed, and imprint the correct postage thereon. One such machine is illustrated in U.S. Pat. No. 3,890,492; issued June 17, 1975, and assigned to the assignee of the present invention. That machine is designed to weigh and print proper postage on 7,000 units of mail per hour without operator intervention. An operator's role is normally limited to placing unmetered mail on a feeder deck at one end of the machine, setting the proper postal rate for the class of mail being handled, starting the machine, and removing the metered mail from a stacker at the other end of the machine.

Since such a machine has an extremely high throughput and is expected to handle items which may be bent or distorted during preparation or before reaching the machine, it is not inconceivable that items may become jammed within the machine. While an operator might hover over the machine to watch for jamming, this would defeat one of the reasons for automating the machine in the first place. Moreover, since the throughput of such a machine is better than one document per second, and since jams should occur infrequently, if ever, an operator whose attention has wandered would not react quickly enough to prevent a serious jam, with the possible consequences of mutilated mail and/or damage to the machine.

Time-based detecting systems are known. In such systems, pieces of mail are expected to pass certain points within the machine at predetermined times. Failure of a piece of mail to arrive at the point by the predetermined time is interpreted as a jam condition.

However, since mail is driven through such machines by friction rollers, a roller may slip for a moment, causing a hesitation in the feeding of mail. This hesitation, although not affecting the primary functions of the mail handling machine, may prevent a piece of mail from reaching a predetermined point when it is supposed to. If that occurs, an invalid jam signal will be generated. Consequently, the machine may be stopped notwithstanding it is processing mail in a normal manner.

SUMMARY OF THE INVENTION

To overcome problems associated with time-based detecting systems, the present invention employs an event-based detecting system which not only detects jams within the machine but also detects failures of sensors within the detecting system.

A malfunction detector constructed in accordance with the present invention includes sensors spaced along a path for pieces transported in seriatim. Each sensor generates a signal whenever an article is sensed by the sensor, provided the previous piece has cleared the sensor. A storage means is connected to each sensor. This storage means, which is initialized by storing a binary 1 signal in a predetermined location, includes means for advancing a marker through succeeding storage locations within the storage means upon receipt of successive sensor signals. The malfunction detector also includes means for comparing the contents of predetermined storage location of one of the storage means with the contents of predetermined storage locations of the storage means connected to the next sensor along the path. If the comparison reveals the concurrent existence of markers in the compared locations, a malfunction-indicating signal is generated. This signal can trigger a shutdown of the machine so that jammed pieces can be cleared or faulty sensors replaced.

DESCRIPTION OF THE DRAWINGS

While the specification concludes with claims particularly pointing out and distinctly claiming that which is regarded as the present invention, details of a particular embodiment of the invention may be more readily ascertained from the following detailed description when read in conjunction with the accompanying drawings wherein:

FIG. 5 depicts the contents of a pair of shift registers connected to adjacent sensors during normal operation of the machine;

FIG. 6 illustrates the contents of the same pair of shift registers when the sensor associated with the first shift register has failed; and FIG. 7 illustrates the contents of the same pair of shift registers when a jam has occurred within the machine.

DETAILED DESCRIPTION

Figure 1:
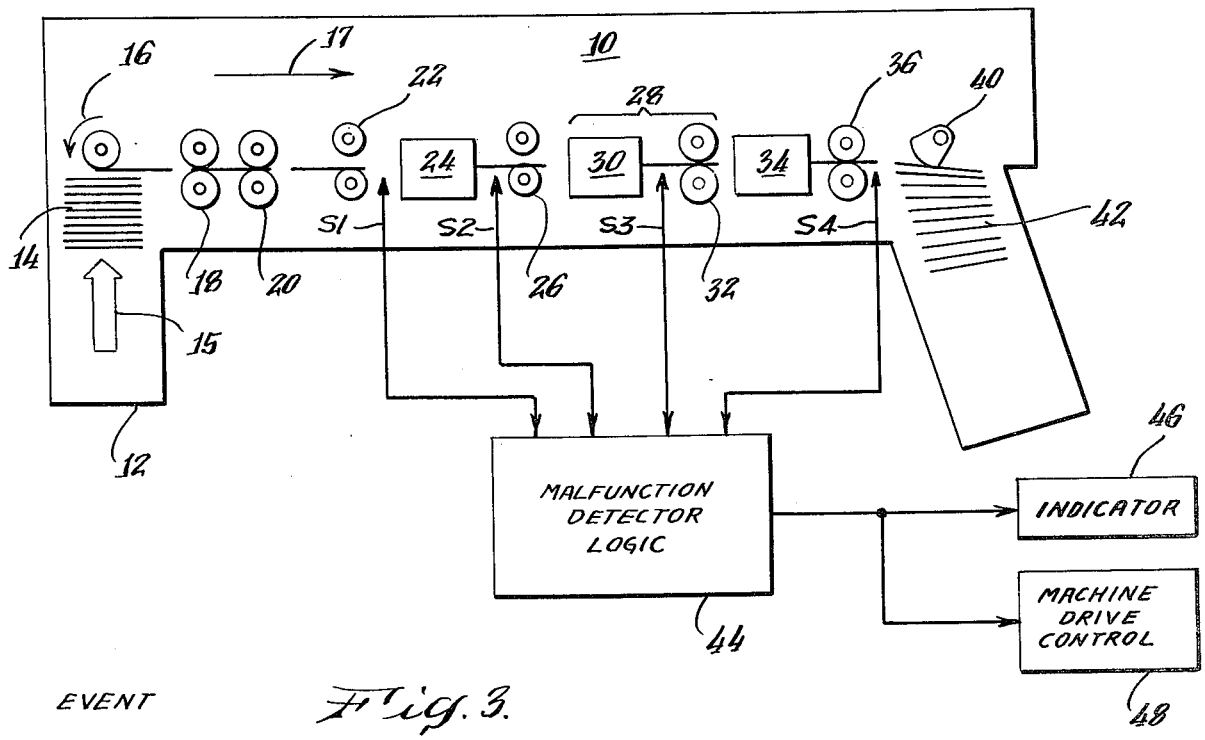
FIG. 1 is a simplified plan view of an automated mail handling machine, including a very general block diagram of the present invention.

Referring now to FIG. 1, a mail handling machine (one example of the invention) shown generally at 10, includes a feeder deck 12 upon which a stack 14 of mail has been deposited. The feeder deck advances the stack 14 in the direction of arrow 15, toward a feed drive mechanism shown as a clutched roller 16. The clutched roller 16 picks off individual pieces of mail and directs them along a path transverse to the direction of deck feed or parallel to arrow 17. The path passes between a first pair 18 of clutched driving rollers and an independently-controlled second pair 20 of clutched driving rollers. The pairs 18 and 20 can be operated independently under the control of photocells (not shown) to assure that each piece of mail is initially spaced from the following piece of mail. The control of roller pairs 18 and 20 is not part of the present invention and no further description is included.

The article flow path passes between separable takeaway rollers 22 and, in one embodiment of the invention, through a scale 24 which can weigh each piece of mail. A first sensor S1 detects the arrival of each piece of mail at the input side of the scale 24.

Mail leaving the scale passes another sensor S2 located on the input side of a pair of separable take-away rollers 26. Pieces of mail are propelled by the take-away rollers 26 to a station 28 which, in one application of the invention, may be employed to seal previously unsealed envelopes. The station 28 may include a moistening section 30 and a pair of sealing rollers 32. A third sensor S3 detects mail leaving moistening section 30 and moving toward the sealing rollers 32. After passing through rollers 32, pieces of mail are directed to a postage metering station 34, the operation of which is synchronized with the operation of the scale 24 to print the proper postage on each piece of mail. Mail leaving the postage metering station 34 passes between a pair of drive rollers 36 and a fourth sensor S4 on the path to a stacker having one or more rotating cams 40 for drawing metered mail onto a stacker deck 42. Metered mail collects on the stacker deck 42 until removed by an operator or until the deck 42 is fully loaded. A convention photo-detector arrangement (not shown) at the end of deck 42 may be used to stop the mail handling machine if the deck 42 is fully loaded.

For automatic detection of jammed pieces of mail, or of failure of up to three of the four sensors S1; S2; S3 and S4, sensor signals are applied to malfunction detector logic 44. The malfunction detector logic 44 is shown with outputs to a jam indicator 46, and to a machine drive control circuit 48. Details of the malfunction detector logic 44 and its theory of operation are described with reference to subsequent figures.

While the mail handling machine described above represents a preferred application for the malfunction detector logic, it does not represent the only application. The logic can be employed in any system wherein discrete items are conveyed in seriatim along a predetermined path.

Figure 2:
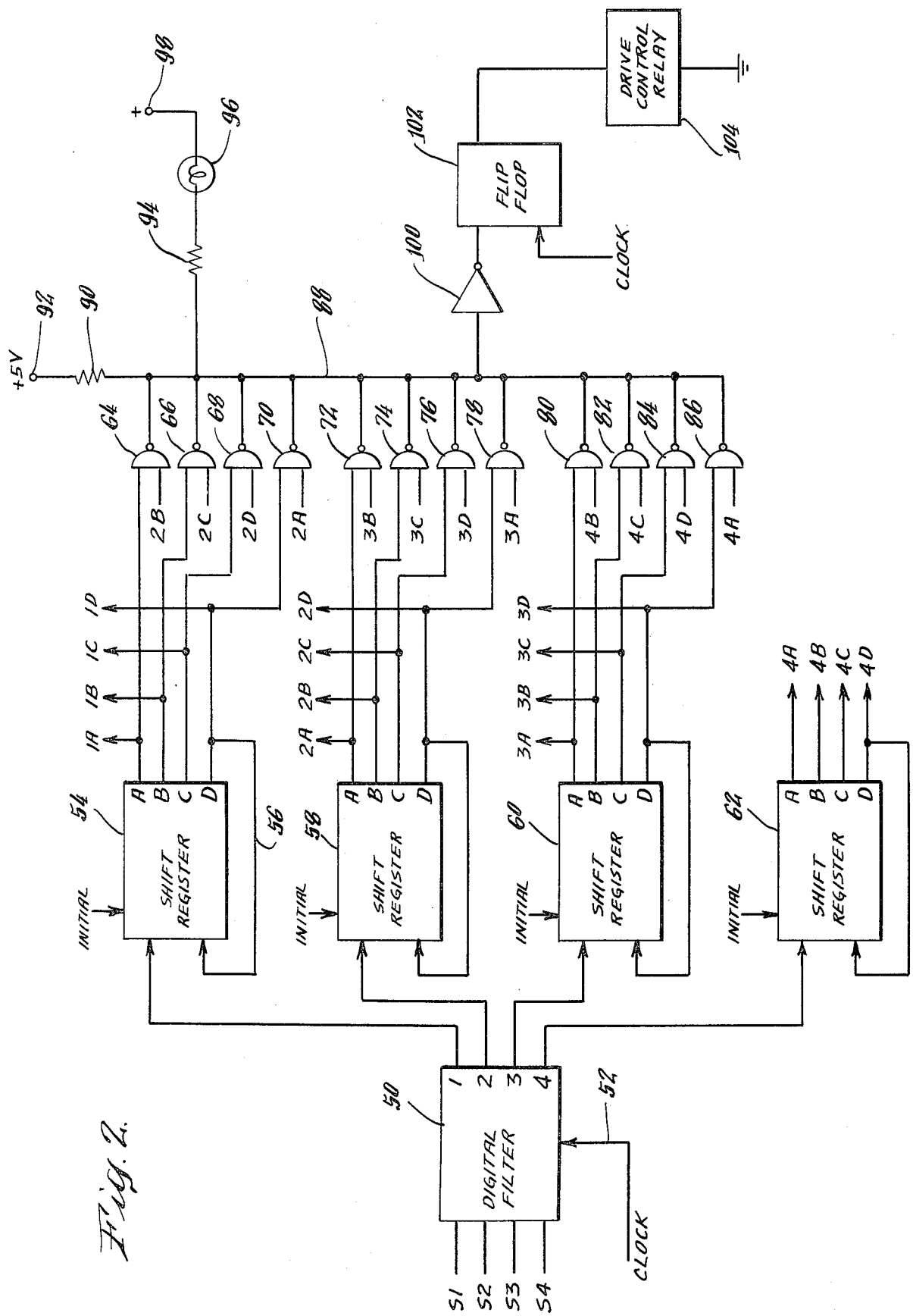
FIG. 2 is a more detailed schematic diagram of logic circuitry employed in a preferred embodiment of the present invention.

Referring now to FIG. 2, signals produced by the sensors S1; S2; S3 and S4, are applied to a digital filter 50 also having a clock input 52. In a preferred embodiment of the invention, the clock signal is a high frequency pulse stream generated elsewhere for use in various other subsystems within the mail handling machine. However, the present invention is not time-synchronized with any other subsystem within a mail handling machine. Therefore, a conventional high frequency oscillator could be used to provide the clock signal.

The digital filter 50 performs a noise filtering function by passing the outputs of sensors S1, S2, S3 and S4 only for the duration of each clock pulse, thus eliminating the possibility of false sensor readings due to system noise occurring between clock pulses. In one embodiment, digital filter 50 consists of parallel, D-type edge-triggered flip-flops. Such flip-flops are available in integrated circuits such as a N74175 circuit available from the Signetics Corporation of Menlo Park, California and described in detail in the 1974 edition of Signetics Data Book. If noise is not a problem, digital filter 50 might be removed from the circuit. In this case, the sensor signals would be applied directly to shift registers described in more detail below.

Output 1 of the digital filter 50 is the time filtered form of the signal produced by sensor S1. This signal is applied to one input of a shift register 54 which, in a preferred embodiment, is a four bit recirculating register having stages A, B, C, D, with the last stage D being connected back to stage A through loop 56.

The filtered output of the sensor S2 is applied to a shift register 58 identical to shift register 54. Similarly, the filtered outputs of sensors S3 and S4, respectively, are applied to shift registers 60 and 62, respectively.

Each stage A, B, C, D of shift register 54 is connected to a different one of NAND gates 64, 66, 68, 70. A second input to each of these NAND gates is provided by connections from the output stages of the shift register 58. More particularly, the second stage output (referred to as 2B) of the shift register 58 is connected to the NAND gate 64. The third stage output 2C of shift register 58 is connected to an input of NAND gate 66, while the fourth stage output 2D is connected to the input of NAND gate 68. The first stage output 2A of shift register 58 is connected to an input of NAND gate 70.

Generalizing, the various NAND gates are connected to a stage $n$ of shift register 54 and to a stage $n+1$ of the shift register 58. Since the shift registers are of a recirculating type, stage A of shift register 58 is considered to be stage $n+1$ relative to stage D of shift register 54. The reasons for the staggered connections of the various stages of the shift registers 54 and 58 are described later.

Stages A, B, C, D of shift register 58 provide respective inputs to NAND gates 72, 74, 76, 78. A second input to each of these NAND gates is provided by outputs 3A, 3B, 3C, 3D from the stages of the third shift register 60. These connections, like connections to NAND gates 64, 66, 68, 70 are also staggered with the second stage output 3B of shift register 60 being logically combined in the NAND gate 72 with the first stage output 2A of shift register 58. The third stage output 3C of shift register 60 is logically combined in NAND Gate 74 with the second stage output 2B of shift register 58. Similarly, outputs 3D and 2C are logically combined in NAND gate 76. The output 2D of the fourth stage of shift register 58 is logically combined with the output 3A of the first stage of shift register 60 in NAND gate 78.

The outputs 3A, 3B, 3C, 3D of shift register 60 provide one input to other NAND Gates 80, 82, 84, 86, respectively. The next higher or $n+1$ stage of the fourth shift register 62 provides a second input to successive ones of these NAND gates.

The common output 88 of the NAND gates is connected through a resistor 90 to a logic level voltage source 92. The output is also connected through a series arrangement of a resistor 94 and an indicator light 96, to another voltage source 98, and through an inverter 100 to a preset input of a flip-flop 102. High frequency clock signals are applied at a clock input to flip-flop 102 to perform a noise filtering operation similar to that performed on the sensor signals by the digital filter 50.

A jam or a sensor failure is indicated when the output of any one of the NAND gates 64 through 86 drops to a low level, reducing the voltage on the common output connection 88. The potential established across the indicator light 96 energizes that light. Also, the low level signal on the common output connection 88 is inverted by inverter amplifier 100 to cause flip-flop 102 to be preset. When the next clock signal is applied, flip-flop 102 is driven to a set state, causing a drive control relay 104 to be energized. Relay 104 is connected in the power circuit for the machine 10 in a conventional manner, to de-energize the driving rollers, motors, etc., when the relay is energized.

Where noise is not a problem, the use of the clock signals could be avoided by triggering the flip-flop 102 directly from the output of inverter 100.

In operation, each of the shift registers 54, 58, 60, 62 is driven to an initial state or condition, when power is first applied to the circuit. In this initial state, a binary 1 is stored in stage A of each of the shift registers, and binary zeros are stored in stages B, C, D. Thereafter, the binary 1 is shifted through successive stages of the shift register upon receipt of signals generated by the sensor connected to that shift register. Since the sensors generate signals only when a new piece is detected, the movement of the binary 1 through the stages, and its position at any point in time, is indicative of the number of pieces that have cleared the particular sensor.

Figure 3:
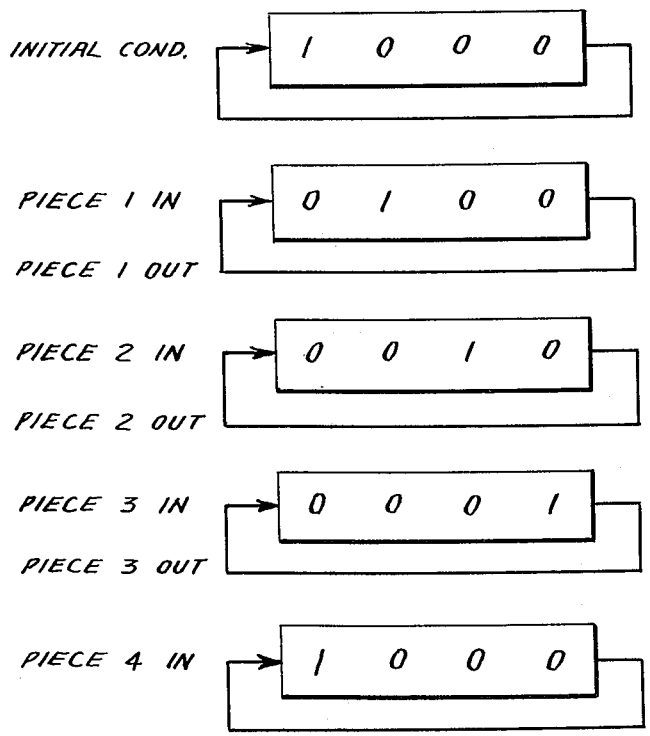
FIG. 3 is a representation of different states of one of the shift registers included within the circuit shown in FIG. 2.

Referring to FIG. 3, which illustrates the contents of the same shift register upon the occurrence of different events, the initial conditions are represented by a 1000 array. When the first piece arrives at the sensor associated with the shift register, the binary 1 is shifted to the second stage of the shift register producing the 0100 configuration. Since shifts are triggered by the arrival of a piece, no change in shift register state takes place when the first piece leaves the vicinity of the sensor. When the second piece arrives, the binary 1 is again shifted to produce the 0100 configuration. The subsequent arrival of the third piece causes another shift, resulting in the 0001 configuration. Since the shift register is of the recirculating type, the arrival of the fourth piece causes the binary 1 to be recirculated from the fourth stage of the shift register back into its first stage. The shifts and recirculation of the binary 1 continue as long as newly arriving pieces continue to be sensed. If a jam occurs, preventing further pieces from reaching the sensor or if the sensor itself fails, the shift register is "frozen" in the last state attained before the malfunction occurred.

By logically comparing the contents of a particular stage of a shift register connected to one sensor, with the contents of the next higher stage of the shift register connected to the next sensor along the flow path, jamming or sensor failures can be detected quickly. A jam or failure is indicated when the comparison shows a binary 1 in both stage $n$ of one shift register, and in stage $n+1$ of the shift register connected to the next sensor along the flow path.

Figure 4:
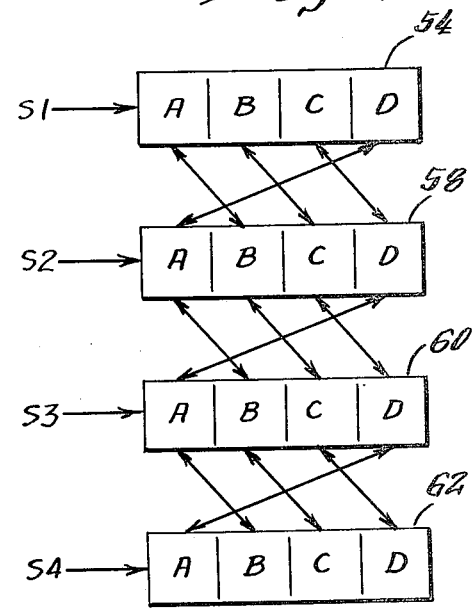
FIG. 4 is a simplified schematic representation of the shift registers included in the circuit of FIG. 2, showing the stages logically compared in a preferred embodiment.

Referring briefly to FIG. 4, which depicts greatly simplified versions of the shift registers 54; 58; 60 and 62, the concurrent existence of binary 1 signals in any pair of shift register stages linked by a double-ended arrow is indicative of a jam or a sensor failure.

The operation of the circuit is illustrated with reference to FIGS. 5 through 7, which represent, respectively, the states of shift registers 54 and 58 during normal operation, where a sensor has failed, and under jam conditions. While shift registers 54 and 58 have been arbitrarily selected for purposes of illustration, the illustration could have been as easily made with reference to shift registers 58 and 60, or with reference to shift registers 60 and 62, since the contents of any sequential pair of shift registers are logically compared.

Referring to FIG. 5, both shift register 54 and shift register 58 are initialized with a binary 1 signal in stage A. The arrival of piece 1 at the sensor connected to shift register 54 causes this binary one to be shifted to stage B of register 54. A comparison of the contents of stage B of shift register 54 with the contents of stage C of shift register 58, which remains at the initialized binary zero, fails to reveal concurrent binary 1 signals in the compared stages. The arrival of the second piece at the sensor for shift register 54 causes the binary 1 to be shifted to the stage C of the register 54. At approximately the same time, the first piece should reach the sensor for shift register 58, causing its binary 1 signal to be shifted to stage B of that register. The comparison of stages $n$ and $n+1$ of the respective shift registers show no concurrently existing binary 1 signals in the compared locations. As long as the machine continues to function normally, the binary 1 signals will continue to be shifted through the shift registers 54 and 58 roughly in phase with one another, so that a binary 1 signal never concurrently exists in stage $n$ of shift register 54, with a binary 1 in stage $n+1$ of shift register 58.

A sensor failure is quickly detected by the described circuit. Referring to FIG. 6, it is assumed for purposes of illustration, that the sensor connected to shift register 54 failed before the machine began to operate. The failed sensor is incapable of producing the signals required to shift the binary 1 through the stages of shift register 54. Therefore, the arrival and departure of the first piece at the sensor for shift register 54 does not alter the initial 1000 state of the register. Nor does the arrival of the second piece. However, when the first piece reaches the sensor connected to shift register 58, the signal generated by that sensor causes the binary 1 to be shifted from stage A of shift register 58 to stage B.

A comparison of the contents of stage A of shift register 54 with the contents of stage B of shift 58, reveals the concurrent existence of binary 1 signals indicative either of a jam or a sensor failure.

Referring briefly to FIG. 2, the concurrent input of binary 1 signals to the NAND gate 64 results in a reduced voltage at the common output connection 88 which, in turn, causes indicator light 96 to be energized, and flip-flop 102 to be preset. When flip-flop 102 is clocked, drive control relay 104 is energized to stop the machine.

Referring to FIG. 7, the contents of the shift registers 54 and 58 are illustrated during a jam condition. Successive pieces are assumed to be clearing the sensor associated with shift register 54 causing the binary 1 signal to be shifted normally through the stages of that shift register. The arrival of the first piece at the sensor connected to shift register 58 causes the binary 1 signal to be shifted to stage B of that shift register. If, for some reason, the second piece never reaches this sensor, the shift register 58 will remain frozen with the binary 1 stored in stage B.

When the fourth piece arrives at the sensor connected to shift register 54, the binary 1 signal is shifted to stage A of that shift register. A comparison of the contents of stage A of shift register 54 with the contents of stage B of shift register 58, which continues to store the binary 1 signal due to the jam, reveals the concurrent existence of binary 1 signals. Referring again briefly to FIG. 2, the concurrent binary 1 signals at the inputs to NAND Gate 64, causes its output connection 88 to fall to a low level, which in turn causes drive control relay 104 and indicator light 86 to be energized.

A significant feature of this invention is that its operation is not time-based but rather event-based. For that reason, deviations in the rate of feed of the machine due to momentary slippage of drive rollers, do not affect the operation of the described circuit. Also, the same circuit could be used without change either with a high throughput device such as a mail handling machine, or with a low throughput device such as a conveyor for manufactured products.

Another feature of this invention is that sensor failures will be detected so long as one sensor out of the total number of sensors employed continues to function.

The number of sensors which are employed in any particular application of the device can be varied according to the needs of the system. The only requirement is that each sensor have an associated shift register, and that logic be included for comparing the outputs of adjacent pairs of shift registers.

The number of bits per shift register is a function of the number of pieces which are allowed to be in transit at any time between sensors; that is, the number of pieces which might accumulate before a jam is sensed. For the four bit shift registers described with reference to the various figures, successive pieces will normally arrive at successive sensors at approximately the same time. No pieces would normally be in transit between the sensors when adjacent sensors are normally sensing arriving pieces. For each bit added to a shift register in excess of four, one additional piece would be in transit between adjacent sensors. Thus, for a five bit shift register, one piece would be in transit between sensors, when the other pieces were arriving at the sensors.

The number of allowable pieces in transit will vary with any particular application. For a high throughput machine handling fragile items, allowing any items to be in transit may not be desirable. For a low throughput machine handling rugged items, it might be possible to allow a substantial number of pieces to be in transit without serious consequences in case a jam occurs.

While there has been described what is thought to be a preferred embodiment of the present invention, variations and modifications of that embodiment will occur to those skilled in the art, once they become aware of the basic concepts of the invention. Therefore, it is intended that the appended claims shall be construed to include all such variations and modifications as fall within the scope of the invention.

What is claimed is:

1. For use with an apparatus for transporting articles in seriatim along a predetermined feed path, a malfunction detector system comprising:
   a. a plurality of sensors spaced along the feed path, each of said sensors being capable of generating a signal when an article is sensed by said sensor;
   b. a storage means connected to each one of said sensors, including means for initially establishing a marker in a predetermined storage location within each of said storage means, and means of advancing the marker through successive storage locations of each storage means upon receipt of successive signals from an associated sensor; and
   c. means for comparing the contents of predetermined storage locations of a pair of storage means associated with successive sensors spaced along the path, said comparing means being responsive to the concurrent existence of markers in the compared locations of said storage means to generate a malfunction-indicating signal.

2. A malfunction detector system as recited in claim 1, wherein each storage means comprises a shift register and each comparison being that of the contents of stage $n$ of one shift register of a pair of shift registers, with the contents of stage $n+1$ of the other shift register of said pair.

3. A malfunction detector system as recited in claim 2, wherein each of said shift registers is a recirculating shift register having a limited number of storage locations equal to the number of sensors spaced along said feed path.

4. A malfunction detector system as recited in claim 2, wherein each of said shift registers is a recirculating, multistage shift register.

5. A malfunction detector system as recited in claim 2, wherein said comparing means includes a plurality of logic gates, each gate having a first input from stage $n$ of one of said pair of shift registers, and a second input from stage $n+1$ of the other shift register of said pair.

6. For use with an article handling apparatus for transporting articles in seriatim along a predetermined feed path, a malfunction detector system comprising:
   a. a plurality of sensors each spaced along the predetermined feed path and each capable of generating a signal indicating an article has arrived at the respective sensor;
   b. a plurality of recirculating, multi-stage shift registers, each shift register being connected to one of said respective sensors and having an initial state wherein a binary 1 signal is stored in one of the stages, each of said shift registers being adapted to shift the binary 1 signal through successive stages upon receipt of successive signals from the respectively connected sensor while maintaining binary zero signals in the remaining stages; and
   c. means for comparing the contents of predetermined stages of a pair of said shift registers connected to successively spaced sensors along the predetermined feed path, said comparing means being responsive to the concurrent existence of binary 1 signals in the compared stages, to generate a malfunction indicating signal.

7. A malfunction detector system as recited in claim 6, wherein each comparison is of the contents of stage $n$ of one shift register of said pair and stage $n+1$ of the other shift register of said pair.

8. A malfunction detector system as recited in claim 7, wherein said comparing means comprises a plurality of logic gates, each having a first input from stage $n$ of one of said pair of shift registers, and a second input from stage $n+1$ of the other shift register of said pair.

9. A malfunction detector system as recited in claim 8, wherein each logic gate is a NAND gate, and wherein said comparing means further includes:
   a. a drive control flip-flop; and
   b. an inverter having its input connected to a common output connection of each of said NAND gates, and its output connected to said drive control flip-flop.

* * * * *